May 6, 1930.　　　　H. G. RENNER　　　　1,757,142
RIVETABLE NUT
Filed Aug. 15, 1927
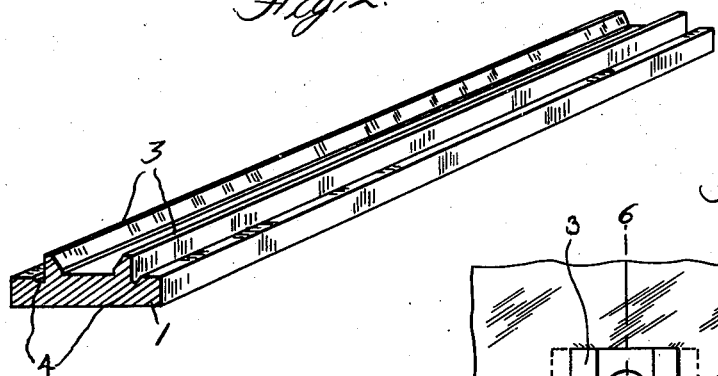
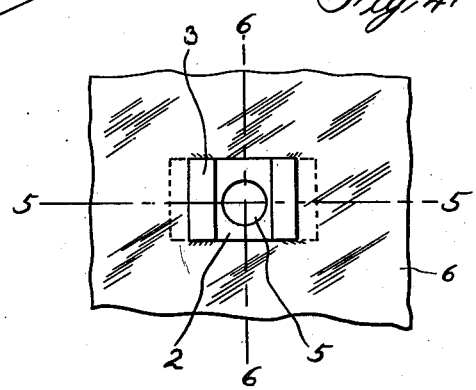
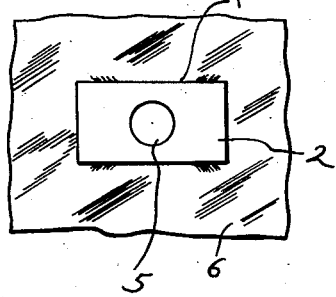
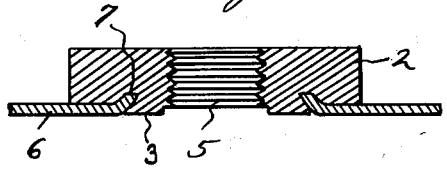
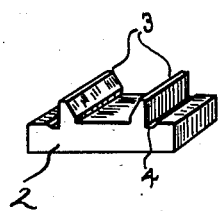
Inventor
Harold G. Renner
By Swan, Frye & Murray
Attorneys Patented May 6, 1930

1,757,142

UNITED STATES PATENT OFFICE

HAROLD G. RENNER, OF DETROIT, MICHIGAN

RIVETABLE NUT

Application filed August 15, 1927. Serial No. 212,921.

This invention relates to screw-threaded nuts and methods of forming same, and particularly to nuts having structural features adapting them to be riveted or similarly anchored to sheet metal or the like. The present construction may be regarded as an improvement upon the disclosure of my Patent No. 1,502,399, issued July 22, 1924.

One object of the invention is to form a nut with a pair of parallel spaced ribs adapted to be inserted in an opening in a sheet metal plate against which the nut seats and adapted to be upset against said plate adjacent to opposite margins of said opening to firmly secure the nut to said plate.

Another object is to form a nut with a pair of spaced parallel ribs for the aforementioned purpose and to groove said nut adjacent to said ribs at the outer sides of the latter so that upon inserting said ribs in an opening of a sheet metal plate and upsetting said ribs upon opposite margins of said opening, said margins will be deflected into said grooves allowing the upset ribs to lie substantially flush with said plate.

A further object is to economically form blanks for nuts adapted to be riveted to sheet metal, by rolling a bar of steel or some other suitable metal or extruding the same through a die so as to produce a pair of spaced longitudinal ribs upon one face of said bar, and then cutting said bar into suitable sized nut blanks and utilizing said ribs as riveting members.

Still another object is to form a nut integrally with a riveting projection (or a pair thereof) and to so fashion said projection that it may be upset outwardly from the axis of rotation of the nut responsive to pressure applied by a flat faced ram or the like actuated in the direction of said axis.

These and various other objects the invention attains by the construction hereinafter described and illustrated in the accompanying drawing, wherein:

Figure 1 is a perspective view of a bar of rolled steel (or other suitable metal) formed with ribs and grooves to adapt blanks cut from said bar to be riveted to sheet metal.

Figure 2 is a perspective view of a blank cut from the bar shown in Figure 1.

Figure 3 is a view of one side of a sheet metal plate, showing the attachment thereto of a nut formed from the blank shown in Figure 2.

Figure 4 is a view of the other side of said plate and nut.

Figure 5 is a cross sectional view of the same taken upon the line 5—5 of Figure 4.

Figure 6 is a relatively transverse sectional view of the same taken upon the line 6—6 of Figure 4.

In these views the reference character 1 designates a rolled or extruded bar of steel, or the like, having a width equal to one of the dimensions of a nut 2 adapted to be blanked from said bar. In the illustrated embodiment of the invention the nuts formed from the bar are of oblong shape and the width of the bar establishes the longer dimension of the nuts. Said bar in the rolling or extrusion thereof is fashioned to form on one of its faces a pair of spaced parallel ribs 3 extending lengthwise of the bar, and having their inner or adjacent faces beveled to converge toward the body of the nut at an angle (as for example, sixty degrees) such as will tend to result in an upsetting of said ribs in opposite directions responsive to a sufficient pressure applied by a flat-faced tool (not shown) in the direction of the axis of the nut. Adjacent to said ribs, at opposite sides thereof, the nut is formed with a pair of grooves 4 co-extensive with said ribs.

In carrying out the invention, the described bar is cut into rectangular blanks such as shown in Figure 2, which are formed with screw-threaded openings 5, produced either before or after cutting of said blanks from the bar.

In attaching one of the nuts thus formed to a sheet metal plate, such as is illustrated at 6, said plate is formed by punching, or in any other suitable manner, with a rectangular opening 7, one dimension of which is equal to the width of said nut and the other to the distance between the outer faces of the ribs 3. Thus the nut is adapted to seat against one face of the plate with the ribs 3 inserted in said opening 7 adjacent to opposite margins thereof. Sufficient pressure is then applied to said ribs by a press or other suitable means, in the direction of the axis of the nut, to upset said ribs oppositely upon the portion of the plate 6 adjacent to said ribs, as shown in Figure 5, and to deflect said portions into the grooves 4 so that the upset ribs lie substantially flush with the face of the plate 6 opposite to that seating the nut.

Thus it is evident that a strong and rigid connection is established between the nut and metal plate and that the nut is quite positively restrained from any rotation upon said plate. The prevention of such rotation is highly essential since the primary object of the invention is to hold the nut fixed without the use of tools when a bolt (not shown) is being engaged therewith or disengaged therefrom. The flush relation established between the plate 6 and the riveting projections 3 is highly desirable to permit any part which may be held engaged with the nut 2 to seat firmly against said plate without clearance, and to prevent any concentration of wear upon said riveting projections.

Forming the described nuts with the projections 3 and the co-acting grooves 4 by initially producing said grooves and ribs in a rolled bar from which the nut blanks are cut greatly reduces the cost of the nuts as compared to fashioning the nuts individually with such projections and grooves.

The described beveling of the inner faces of the ribs 3 permits a plane faced ram or tool to be used in oppositely upsetting said ribs to rivet the nut upon a sheet metal plate, and avoids the accurate positioning of such ram with respect to the ribs that would be required if the ram were provided with upsetting faces inclined to its axis of travel.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. A nut blank comprising a rectangular metallic member formed with a pair of spaced parallel ribs projecting from one surface of such blank to form riveting projections and extending completely across said blank, the adjacent faces of said ribs being beveled to adapt said ribs to be upset oppositely responsive to a pressure applied to said ribs transversely to such surface.

2. A nut blank formed with a pair of spaced parallel riveting ribs extending completely across one face thereof and further formed with grooves coextensive with and adjacent to said ribs, and at opposite sides of said ribs.

3. A nut blank formed with a pair of spaced parallel riveting ribs extending completely across one face thereof, and further formed with grooves coextensive with and adjacent to said ribs at opposite sides of the ribs, the faces of said ribs remote from said grooves being beveled to facilitate riveting.

4. A nut blank formed upon one of its end faces with a pair of spaced, rectilinear riveting ribs, extending substantially across said face and substantially parallel to opposite margins thereof and set back from said margins to adapt the portions of said end face between said ribs and margins to seat the nut formed from said blank against a member to which the nut is to be riveted.

5. A nut blank formed upon one of its end faces with a pair of spaced, rectilinear riveting ribs, extending substantially across said face and substantially parallel to opposite margins thereof, and further formed with grooves coextensive with, adjacent to, and at opposite sides of said ribs, said end face having areas between said grooves and margins providing seats to engage a member to which a nut formed from said blank is riveted.

In testimony whereof I sign this specification.

HAROLD G. RENNER.